US012628091B2

(12) United States Patent
Pettersson et al.

(10) Patent No.: US 12,628,091 B2
(45) Date of Patent: May 12, 2026

(54) SPATIAL-REUSE BASED TXOP SHARING FOR RANDOM ACCESS TRANSMISSIONS

(71) Applicant: Telefonaktiebolaget LM Ericsson (publ), Stockholm (SE)

(72) Inventors: Charlie Pettersson, Solna (SE); Jonas Sedin, Brentford (GB); Sebastian Max, Cologne (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 362 days.

(21) Appl. No.: 18/287,718

(22) PCT Filed: Apr. 21, 2022

(86) PCT No.: PCT/EP2022/060569
§ 371 (c)(1),
(2) Date: Oct. 20, 2023

(87) PCT Pub. No.: WO2022/223701
PCT Pub. Date: Oct. 27, 2022

(65) Prior Publication Data
US 2024/0214945 A1      Jun. 27, 2024

Related U.S. Application Data

(60) Provisional application No. 63/178,681, filed on Apr. 23, 2021.

(51) Int. Cl.
*H04W 74/0833*          (2024.01)
*H04W 52/24*            (2009.01)

(52) U.S. Cl.
CPC ....... *H04W 52/242* (2013.01); *H04W 52/243* (2013.01); *H04W 74/0833* (2013.01)

(58) Field of Classification Search
CPC ............. H04W 52/242; H04W 52/243; H04W 74/0833; H04W 52/42; H04W 52/50; H04W 52/146
See application file for complete search history.

(56) References Cited

U.S. PATENT DOCUMENTS

| | | | |
|---|---|---|---|
| 10,601,612 B2 * | 3/2020 | Kapetanovic | ....... H04L 25/0222 |
| 12,342,376 B2 * | 6/2025 | Sundman | .......... H04W 74/0816 |

(Continued)

FOREIGN PATENT DOCUMENTS

| | | | | |
|---|---|---|---|---|
| WO | WO-2021176062 A1 * | 9/2021 | ........ | H04W 74/0816 |

OTHER PUBLICATIONS

IEEE Standards Association, "Standard for Information technology—Telecommunications and information exchange between systems Local and metropolitan area networks", IEEE P802.11be, Mar. 21, 2019, pp. 1-2.

(Continued)

*Primary Examiner* — Abdullahi E Salad
(74) *Attorney, Agent, or Firm* — COATS & BENNETT, PLLC

(57) ABSTRACT

A wireless station (11) determines a path loss of a wireless signal path between the wireless station (11) and a first access point (10). The first access point (10) cooperates with a second access point (10) by sharing a transmit opportunity based on coordinated spatial reuse of at least one resource of the shared transmit opportunity. Further, the wireless station (11) receives, from the second access point (10), an indication of a level of allowed interference on the at least one resource of the shared transmit opportunity. Based on the determined path loss and the indication of the level of allowed interference, the wireless station (11) controls a transmit power of at least one wireless random access transmission performed on the at least one resource of the (Continued)

shared transmit opportunity from the wireless station (11) to the second access point (10).

20 Claims, 10 Drawing Sheets

(56)                    References Cited

U.S. PATENT DOCUMENTS

| | | | |
|---|---|---|---|
| 2011/0003611 A1* | 1/2011 | Haas ..................... | H04W 52/10 |
| | | | 455/512 |
| 2016/0174079 A1* | 6/2016 | Wang .................... | H04W 16/14 |
| | | | 455/454 |
| 2021/0136679 A1* | 5/2021 | Verma ................... | H04W 72/23 |
| 2021/0410163 A1* | 12/2021 | Xia ..................... | H04W 72/121 |
| 2023/0163808 A1* | 5/2023 | Lou ..................... | H04W 74/002 |
| | | | 455/101 |
| 2023/0319886 A1* | 10/2023 | Wang .................... | H04L 5/0005 |
| | | | 370/329 |
| 2023/0412330 A1* | 12/2023 | Verma .................. | H04L 5/0035 |
| 2024/0137980 A1* | 4/2024 | Ajami .................. | H04W 84/12 |
| 2024/0292345 A1* | 8/2024 | Lanante ............... | H04W 52/38 |

OTHER PUBLICATIONS

Han, J., et al., "Coordinated Spatial Reuse: Extension to Uplink", IEEE 802.11-20/1040r2, Jul. 10, 2020, pp. 1-18.

* cited by examiner

410 — Determine path loss to first AP

420 — Receive indication(s) from second AP

430 — Control transmit power of random access transmission

510 — Module 1:
Determining path loss to first AP

520 — Module 2:
Receiving indication(s) from second AP

530 — Module 3:
Controlling transmit power of
random access transmission

WIRELESS STATION

500

610 — Contend for medium

620 — Coperate with further AP by spatial reuse based sharing of TXOP

630 — Receive indication of allowed interference level from other AP

640 — Send indication of allowed interference level to wireless station

650 — Receive random access transmission from wireless station

810 —⟨ Contend for medium

820 —⟨ Reserve TXOP

830 —⟨ Coperate with
further AP by spatial reuse based
sharing of the TXOP

840 —⟨ Send indication(s) for transmit power
control of random access
transmission to further AP 910 ~ Module 1:
Contending for medium 920 ~ Module 2:
Reserving TXOP 930 ~ Module 3:
Cooperating by spatial reuse based
sharing of the TXOP 940 ~ Module 4:
Sending indication(s) for transmit power
control of random access transmission
to further AP

900

ACCESS POINT

SPATIAL-REUSE BASED TXOP SHARING FOR RANDOM ACCESS TRANSMISSIONS

TECHNICAL FIELD

The present invention relates to methods for controlling wireless transmissions and to corresponding devices, systems, and computer programs.

BACKGROUND

In wireless communication technologies, there is an increased interest in using unlicensed bands, like the 2.4 GHz ISM band, the 5 GHz band, the 6 GHz band, and the 60 GHz band using more advanced channel access technologies. Historically, Wi-Fi has been the dominant standard in unlicensed bands when it comes to applications requiring support for high data rates. Due to the large available bandwidth in the unlicensed band, the WLAN (Wireless Local Area Network) technology based on the IEEE 802.11 family standards provides a very simple distributed channel access mechanism based on the so-called distributed coordination function (DCF).

Distributed channel access means that a device, in IEEE 802.11 terminology known as a station (STA), tries to access the channel when it has data to send. Effectively there is no difference in channel access whether the station is an access point (AP) or a non-access point (non-AP). DCF works well as long as the load is not too high. When the load is high, and in particular when the number of stations trying to access the channel is large, channel access based on DCF does not work well. The reason for this is that there will be a high probability of collision on the channel, leading to poor channel usage.

To improve the channel usage, and in particular to allow for better support of a large number of devices, a more centralized channel access may be utilized. Such centralized channel access may involve that rather than letting a STA access the channel whenever it has data to send, the channel access is controlled by the AP. A corresponding channel access scheme is for example supported in the IEEE 802.11ax technology, see IEEE P802.11ax™/D6.0 Draft Standard for Information technology—Tele-communications and information exchange between systems Local and metropolitan area networks-Specific requirements Part 11: Wireless LAN Medium Access Control (MAC) and Physical Layer (PHY) Specifications Amendment 1: Enhancements for High Efficiency WLAN (November 2019), in the following denoted as "IEEE 802.11ax Draft". The IEEE 802.11ax technology for example supports orthogonal frequency division multiple access (OFDMA) in both downlink (DL), i.e., in a direction from the AP to the STA, and uplink (UL), i.e., in a direction from the STA to the AP. Also multi-user transmission in form of multi-user multiple input multiple output (MU-MIMO) is supported for both the DL and the UL. By supporting MU transmission and letting the AP control the channel access within a cell, efficient channel usage is achieved and one can avoid collisions due to contention in the cell, in the IEEE 802.11 terminology also referred to as basic service set (BSS).

A default channel access mechanism used in current WLAN systems is referred to as enhanced distributed channel access (EDCA), as specified in IEEE Standard for Information technology—Telecommunications and information exchange between systems Local and metropolitan area networks—Specific requirements—Part 11: Wireless LAN Medium Access Control (MAC) and Physical Layer (PHY) Specifications," in IEEE Std 802.11-2016 (Revision of IEEE Std 802.11-2012), vol., no., pp. 1-3534, 14 Dec. 2016, in the following denoted as "IEEE 802.11 PHY Specifications". In the EDCA channel access mechanism, the STA accesses the channel using a set of channel access parameters based on a traffic class of the data. The channel may be obtained for a TXOP (transmit opportunity) which corresponds to a time duration in which multiple frames of the same data class may be transmitted. The maximum size of a TXOP depends on the data priority class. A typical duration of a TXOP is in the range of a few milliseconds.

To improve the performance even further, coordination of channel usage between cells may be utilized. Here, one approach is to let a number of APs share a TXOP. For example, if there are two or more APs within range using the same channel, with no coordination each of them would contend for the channel and the AP that wins the contention would then reserve the channel using the TXOP concept. The other APs would have to defer from channel access and wait for the TXOP to end. Then a new contention begins and channel access may or may not be gained for a specific AP. This implies that channel access becomes rather unpredictable and support for demanding QoS (Quality of Service) applications may be challenging. Such issues may be avoided by coordinated sharing of the TXOP by multiple APs. Such features are also referred to as coordinated or cooperating APs (CAP).

For example, "Coordinated AP Time/Frequency Sharing in a Transmit Opportunity in 11be", Internet document IEEE 802.11-19/1582r1 (URL: "https://mentor.ieee.org/802.11/dcn/19/11-19-1582-01-00be-coordinated-ap-time-and-frequency-sharing-in-a-transmit-opportunity-in-11be.pptx", November 2019) proposes a time/frequency resource sharing mechanism for an enhancement of the WLAN technology referred to as EHT (Extremely High Throughput). In this mechanism multiple APs belonging to the same Extended Service Set (ESS) can coordinate and share among themselves their time/frequency resources within a TXOP. The proposed mechanism may consist of multiple phases. In a setup phase an AP that has gained a TXOP, also denoted as the TXOP owner, may indicate to other APs that it is willing to share the TXOP, e.g., by sending a TX indication frame, and one or more neighboring APs indicate their intention to participate in sharing the resources, e.g. by sending a request frame. The TXOP owner may also be referred to as "Sharing AP", and the participating AP(s) may also be referred to as "Shared AP(s)". Further, the TXOP owner may inform the participating APs about their allocated resources and a TX start time, and the participating APs may inform their client STAs about their respective resource allocations. In a subsequent phase the participating APs transmit on their respective allocated resources in the TXOP, beginning at the TX start time.

The sharing of the TXOP during the transmission of data in the third phase can be based on multiplexing in the time domain, e.g., TDMA (Time Division Multiple Access), multiplexing in the frequency domain, e.g., OFDMA, or multiplexing in the spatial domain, e.g., using MU-MIMO (Multi-User Multiple Input/Multiple Output).

Further, the sharing of the TXOP can be based on spatial reuse, which is also referred to as coordinated spatial reuse (CSR). In such variants, the resources of the TXOP can be used simultaneously, sometimes in combination with transmit power control, and multiplexing of the resources of the TXOP is not required. CSR-based operation is for example described in "Coordinated Spatial Reuse: Extension to Uplink", Internet document IEEE 802.11-20/1040r2 (URL: https://mentor.ieee.org/802.11/dcn/20/11-20-1040-02-00be-
coordinated-sr-for-uplink.pptx, July 2020).

CSR can be used to improve the spatial efficiency in a system consisting of more than one AP. As compared to coordinated beamforming which aims to increase spatial efficiency by nulling towards other devices, in the case of CSR the same frequency and time resources may be used for multiple transmissions, sometimes combined with coordinated power control between the APs such that the interference levels are tolerable at the different receivers of each BSS.

In CSR, the transmissions in DL or UL are done by the AP or the STA in a spatially reused manner and according to the parameters that have been exchanged in the setup phase. For DL transmissions, the sharing AP may calculate the transmission power that the shared AP is allowed to use in order to achieve sufficient SINR (Signal to Interference plus Noise Ratio) at the STA.

In the case of UL transmission, the sharing AP may signal a tolerable interference level (TIL) to the shared AP. The shared AP may then instruct its associated STAs to transmit at a power level which ensures that the TIL is not exceeded.

However, the above approach is not applicable to certain types of UL transmissions. For example, IEEE 802.11ax technology also provides a special operation mode for the UL, referred to as UL OFDMA random access (UORA). UORA is intended to be used for UL messages that are impossible to schedule, such as management messages from STAs that are not yet associated, delivery of buffer status reports (BSRs) from the STAs to the AP to request for UL resources, or any other transmissions that cannot be scheduled.

UORA is initialized by the AP by signaling in a TF (trigger frame) that certain resource units (RUs) do not belong to a particular STA but are intended to be used for random access, i.e., are declared as random access RUs (RA-RUs). Then, each STA that has no dedicated RU may select one of these RUs randomly for a random access transmission. Similar to the legacy medium access, to reduce the probability of collisions the STAs must count down a random backoff to zero beforehand. Each indicated RA-RU allows to reduce the back-off by one. If the STA detects a collision, e.g., because it did not receive an acknowledgement (ACK) for the random access transmission, a contention window for the next random backoff is doubled.

For UORA and similar non-scheduled random access transmissions, the above mechanism for UL CSR is not applicable because the shared AP cannot use the scheduling of the STA to control the transmit power of an UL transmission.

Accordingly, there is a need for techniques which allow for improved utilization of coordinated spatial reuse for unscheduled uplink transmissions between.

SUMMARY

According to an embodiment, a method of controlling wireless transmissions in a wireless communication system is provided. According to the method, a wireless station determines a path loss of a wireless signal path between the wireless station and a first AP. The first AP cooperates with a second AP by sharing a TXOP based on coordinated spatial reuse of at least one resource of the shared TXOP. Further, the wireless station receives, from the second AP, an indication of a level of allowed interference on the at least one resource of the shared TXOP. Based on the determined path loss and the indication of the level of allowed interference, the wireless station controls a transmit power of at least one wireless random access transmission performed on the at least one resource of the shared TXOP from the wireless station to the second AP.

According to a further embodiment, a method of controlling wireless transmissions in a wireless communication system is provided. According to the method, an AP of the wireless communication system cooperates with a further AP of the wireless communication system by sharing a TXOP based on coordinated spatial reuse of at least one resource of the shared TXOP. Further, the AP receives, from the further AP, an indication of a first level of allowed interference on the at least one resource of the shared TXOP. Based on the first level of allowed interference, the AP sends, to a wireless station, an indication of a second level of allowed interference on the at least one resource of the shared TXOP, to be applied by the wireless station in controlling a wireless random access transmission on the at least one resource of the shared TXOP. Further, the AP receives, from the wireless station, at least one wireless random access transmission performed on the at least one resource of the shared TXOP, with a transmit power of the at least one wireless random access transmission depending on the indicated second level of allowed interference.

According to a further embodiment, a method of controlling wireless transmissions in a wireless communication system is provided. According to the method, an AP of the wireless communication system cooperates with a further AP of the wireless communication system by sharing a TXOP based on coordinated spatial reuse of at least one resource of the shared TXOP. Further, the AP sends, to the further AP, an indication of a level of allowed interference on the at least one resource of the shared TXOP, to be applied in controlling transmit power a wireless random access transmission on the at least one resource of the shared TXOP from a wireless station to the further AP.

According to a further embodiment, a wireless station for a wireless communication system is provided. The wireless station is configured to determine a path loss of a wireless signal path between the wireless station and a first AP, the first AP cooperating with a second AP by sharing a TXOP based on coordinated spatial reuse of at least one resource of the shared TXOP. Further, the wireless station is configured to receive, from the second AP, an indication of a level of allowed interference on the at least one resource of the shared TXOP. Further, the wireless station is configured to control, based on the determined path loss and the indication of the level of allowed interference, a transmit power of at least one wireless random access transmission performed on the at least one resource of the shared TXOP from the wireless station to the second AP.

According to a further embodiment, a wireless station for a wireless communication system is provided. The wireless station comprises at least one processor and a memory. The memory contains instructions executable by said at least one processor, whereby the wireless station is operative to determine a path loss of a wireless signal path between the wireless station and a first AP, the first AP cooperating with a second AP by sharing a TXOP based on coordinated spatial reuse of at least one resource of the shared TXOP. Further, the memory contains instructions executable by said at least one processor, whereby the wireless station is operative to receive, from the second AP, an indication of a level of allowed interference on the at least one resource of the shared TXOP. Further, the memory contains instructions executable by said at least one processor, whereby the wireless station is operative to control, based on the determined path loss and the indication of the level of allowed interference, a transmit power of at least one wireless random access transmission performed on the at least one resource of the shared TXOP from the wireless station to the second AP.

According to a further embodiment, an AP for a wireless communication system is provided. The AP is configured to cooperate with a further AP of the wireless communication system by sharing a TXOP based on coordinated spatial reuse of at least one resource of the shared TXOP. Further, the AP is configured to receive, from the further AP, an indication of a first level of allowed interference on the at least one resource of the shared TXOP. Further, the AP is configured to, based on the first level of allowed interference, send to a wireless station an indication of a second level of allowed interference on the at least one resource of the shared TXOP, to be applied by the wireless station in controlling a wireless random access transmission on the at least one resource of the shared TXOP. Further, the AP is configured to receive, from the wireless station, at least one wireless random access transmission performed on the at least one resource of the shared TXOP, with a transmit power of the at least one wireless random access transmission depending on the indicated second level of allowed interference.

According to a further embodiment, an AP for a wireless communication system is provided. The AP comprises at least one processor and a memory. The memory contains instructions executable by said at least one processor, whereby the AP is operative to cooperate with a further AP of the wireless communication system by sharing a TXOP based on coordinated spatial reuse of at least one resource of the shared TXOP. Further, the memory contains instructions executable by said at least one processor, whereby the AP is operative to receive, from the further AP, an indication of a first level of allowed interference on the at least one resource of the shared TXOP. Further, the memory contains instructions executable by said at least one processor, whereby the AP is operative to, based on the first level of allowed interference, send to a wireless station an indication of a second level of allowed interference on the at least one resource of the shared TXOP, to be applied by the wireless station in controlling a wireless random access transmission on the at least one resource of the shared TXOP. Further, the memory contains instructions executable by said at least one processor, whereby the AP is operative to receive, from the wireless station, at least one wireless random access transmission performed on the at least one resource of the shared TXOP, with a transmit power of the at least one wireless random access transmission depending on the indicated second level of allowed interference.

According to a further embodiment, an AP for a wireless communication system is provided. The AP is configured to cooperate with a further AP of the wireless communication system by sharing a TXOP based on coordinated spatial reuse of at least one resource of the shared TXOP. Further, the AP is configured to send, to the further AP, an indication of a level of allowed interference on the at least one resource of the shared TXOP, to be applied in controlling transmit power a wireless random access transmission on the at least one resource of the shared TXOP from a wireless station to the further AP.

According to a further embodiment, an AP for a wireless communication system is provided. The AP comprises at least one processor and a memory. The memory contains instructions executable by said at least one processor, whereby the AP is operative to cooperate with a further AP of the wireless communication system by sharing a TXOP based on coordinated spatial reuse of at least one resource of the shared TXOP. Further, the memory contains instructions executable by said at least one processor, whereby the AP is operative to send, to the further AP, an indication of a level of allowed interference on the at least one resource of the shared TXOP, to be applied in controlling transmit power a wireless random access transmission on the at least one resource of the shared TXOP from a wireless station to the further AP.

According to a further embodiment of the invention, a computer program or computer program product is provided, e.g., in the form of a non-transitory storage medium, which comprises program code to be executed by at least one processor of a wireless station for a wireless communication system is provided. Execution of the program code causes the wireless station to determine a path loss of a wireless signal path between the wireless station and a first AP, the first AP cooperating with a second AP by sharing a TXOP based on coordinated spatial reuse of at least one resource of the shared TXOP. Further, execution of the program code causes the wireless station to receive, from the second AP, an indication of a level of allowed interference on the at least one resource of the shared TXOP. Further, execution of the program code causes the wireless station to control, based on the determined path loss and the indication of the level of allowed interference, a transmit power of at least one wireless random access transmission performed on the at least one resource of the shared TXOP from the wireless station to the second AP.

According to a further embodiment of the invention, a computer program or computer program product is provided, e.g., in the form of a non-transitory storage medium, which comprises program code to be executed by at least one processor of an AP for a wireless communication system is provided. Execution of the program code causes the AP to cooperate with a further AP of the wireless communication system by sharing a TXOP based on coordinated spatial reuse of at least one resource of the shared TXOP. Further, execution of the program code causes the AP to receive, from the further AP, an indication of a first level of allowed interference on the at least one resource of the shared TXOP. Further, execution of the program code causes the AP to, based on the first level of allowed interference, send to a wireless station an indication of a second level of allowed interference on the at least one resource of the shared TXOP, to be applied by the wireless station in controlling a wireless random access transmission on the at least one resource of the shared TXOP. Further, execution of the program code causes the AP to receive, from the wireless station, at least one wireless random access transmission performed on the at least one resource of the shared TXOP, with a transmit power of the at least one wireless random access transmission depending on the indicated second level of allowed interference.

According to a further embodiment of the invention, a computer program or computer program product is provided, e.g., in the form of a non-transitory storage medium, which comprises program code to be executed by at least one processor of an AP for a wireless communication system is provided. Execution of the program code causes the AP to cooperate with a further AP of the wireless communication system by sharing a TXOP based on coordinated spatial reuse of at least one resource of the shared TXOP. Further, execution of the program code causes the AP to send, to the further AP, an indication of a level of allowed interference on the at least one resource of the shared TXOP, to be applied in controlling transmit power a wireless random access transmission on the at least one resource of the shared TXOP from a wireless station to the further AP.

Details of such embodiments and further embodiments will be apparent from the following detailed description of embodiments.

DETAILED DESCRIPTION

In the following, concepts in accordance with exemplary embodiments of the invention will be explained in more detail and with reference to the accompanying drawings. The illustrated embodiments relate to controlling of wireless transmissions in a wireless communication system. The wireless communication system may be a WLAN (Wireless Local Area Network) system based on an IEEE 802.11 technology. However, it is noted that the illustrated concepts could also be applied to other wireless communication technologies, e.g., to contention-based modes of the LTE (Long Term Evolution) or NR (New Radio) technology specified by 3GPP ($3^{rd}$ Generation Partnership Project).

The illustrated concepts involve CSR-based sharing of a TXOP for wireless random access transmissions. The wireless random access transmissions correspond to unscheduled uplink transmissions, such as UORA transmissions. For enabling the CSR-based sharing for the random access transmissions, an AP informs a STA about a level of allowed interference on one or more shared resources, in particular shared resources of a TXOP shared by another AP. The STA may then determine a path loss to the other AP and, based on the path loss and the indicated level of allowed interference, control transmit power of a wireless random access transmission to the AP. The wireless random access transmission may for example be an UORA transmission, e.g., a management message from a STA that is not yet associated or a message for delivery of one or more buffer status reports and/or requesting allocation of uplink resources. Accordingly, the STA is provided with information which enables the STA to autonomously control the transmit power of the wireless random access transmission in such a way that the level of allowed interference on the one or more shared resources is not exceeded. A need for direct signaling of the transmit power to be applied, e.g., along with scheduling information, can thus be avoided.

Figure 1:
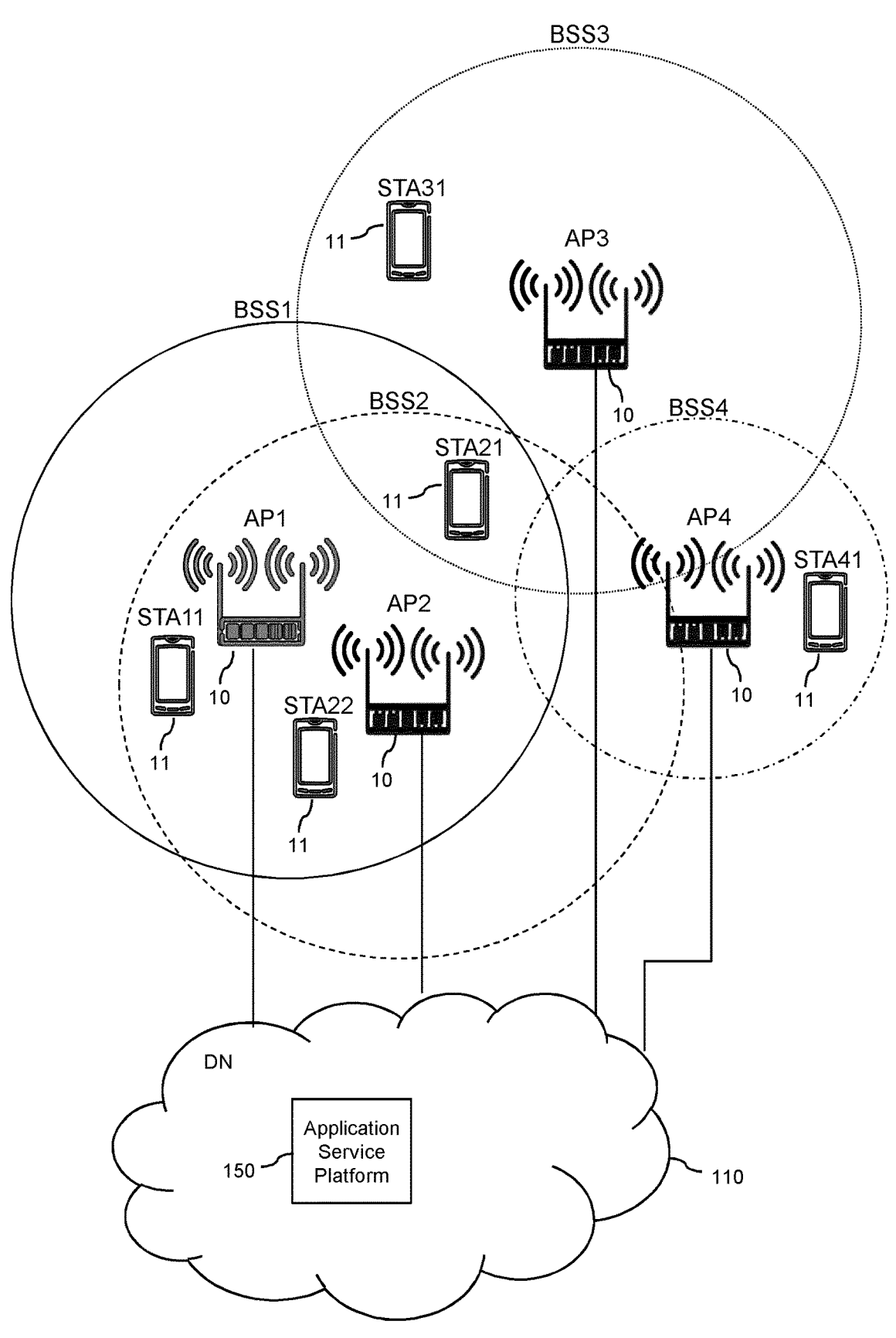
FIG. 1 schematically illustrates a wireless communication system according to an embodiment.

FIG. 1 illustrates an exemplary wireless communication system according to an embodiment. In the illustrated example, the wireless communication system includes multiple access points (APs) 10, in the illustrated example referred to as AP1, AP2, AP3, AP4, and multiple stations (STAs) 11, in the illustrated example referred to as STA11, STA21, STA22, STA31, and STA41. The station STA11 is served by AP1 (in a first BSS denoted as BSS1), the stations STA21 and STA22 are served by AP2 (in a second BSS denoted as BSS2). The station STA31 is served by AP3 (in a third BSS denoted as BSS3). The station STA41 is served by AP4 (in a fourth BSS denoted as BSS4). The stations 11 may correspond to various kinds of wireless devices, for example user terminals, such as mobile or stationary computing devices like smartphones, laptop computers, desktop computers, tablet computers, gaming devices, or the like. Further, the stations 11 could for example correspond to other kinds of equipment like smart home devices, printers, multimedia devices, data storage devices, or the like.

In the example of FIG. 1, each of the stations 11 may connect through a radio link to one of the APs 10. For example depending on location or channel conditions experienced by a given station 11, the station 11 may select an appropriate AP 10 and BSS for establishing the radio link. The radio link may be based on one or more OFDM carriers from a frequency spectrum which is shared on the basis of a contention based mechanism, e.g., an unlicensed band like the 2.4 GHZ ISM band, the 5 GHz band, the 6 GHz band, or the 60 GHz band.

Figure 4:
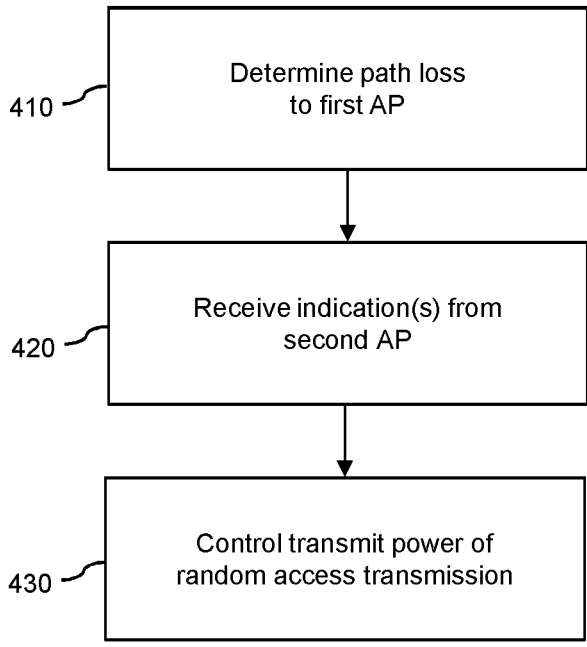
FIG. 4 shows a flowchart for schematically illustrating a method according to an embodiment.

Each AP 10 may provide data connectivity of the stations 11 connected to the AP 10. As further illustrated, the APs 10 may be connected to a data network (DN) 110. In this way, the APs 10 may also provide data connectivity of stations 11 connected to different APs 10. Further, the APs 10 may also provide data connectivity of the stations 11 to other entities, e.g., to one or more servers, service providers, data sources, data sinks, user terminals, or the like. Accordingly, the radio link established between a given station 11 and its serving AP 10 may be used for providing various kinds of services to the station 11, e.g., a voice service, a multimedia service, or other data service. Such services may be based on applications which are executed on the station 11 and/or on a device linked to the station 11. By way of example, FIG. 4 illustrates an application service platform 150 provided in the DN 110. The application(s) executed on the station 11 and/or on one or more other devices linked to the station 11 may use the radio link for data communication with one or more other stations 11 and/or the application service platform 150, thereby enabling utilization of the corresponding service(s) at the station 11.

To achieve high performance in a scenario like illustrated in FIG. 1, coordination between the cells or BSSs may be utilized. For example, at least some of the involved APs 10 may contend for and share common resources. In particular, two or more of the APs 10 may contend for the same wireless medium or radio channel in order to obtain a TXOP. Then, the winning AP 10 can share the resources with the other contending APs in a dynamic fashion. For example, it can share the resources differently in different TXOPs. The wireless medium or radio channel may be based on one or more carriers, e.g., OFDM carriers. In the illustrated concepts, the sharing of the TXOP is assumed to utilize CSR-based sharing for at least some of the radio resources of the TXOP.

Figure 2:
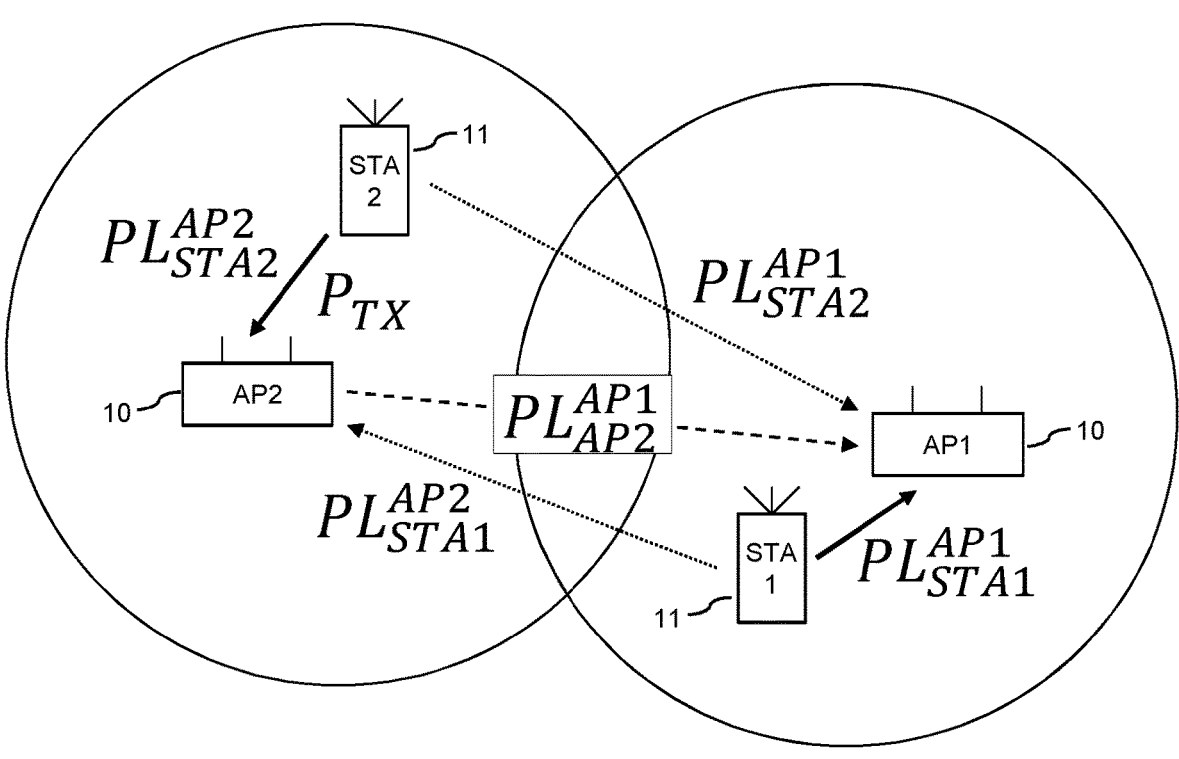
FIG. 2 schematically illustrates a scenario involving CSR-based UL transmissions according to an embodiment.

FIG. 2 shows an exemplary scenario for illustrating CSR-based sharing of resources of a TXOP for UORA transmissions. These resources are in the following referred to as RA-RUs. However, it is noted that the concepts explained in connection with FIG. 2 could also be applied to other non-scheduled UL transmissions. The scenario of FIG. 2 involves two APs 10, denoted as AP1 and AP2, and two STAs 11, denoted as STA1 and STA2. These APs 10 and STAs 11 could for example correspond to some of the APs 10 and STAs 11 illustrated in FIG. 1. FIG. 2 also shows path losses which may be relevant in the CSR-based sharing of resources, namely a path loss of a signal path between STA1 and AP1, denoted as $$PL_{STA1}^{AP1},$$

a path loss of a signal path between STA2 and AP1, denoted as $$PL_{STA2}^{AP1},$$

and a path loss of a signal path between STA1 and AP2, denoted as $$PL_{STA1}^{AP2}.$$

In the scenario of FIG. 2, it is further assumed that STA1 is already associated to AP1, and that STA2 is not yet associated to any of AP1 and AP2, but is in communication range of AP2. Further, in the scenario of FIG. 2, it is further assumed that AP1 reserved a TXOP, and CSR-based sharing of resources of the TXOP, is used to share at least the RA-RUs with AP2. Accordingly, in the illustrated example, AP1 would act as a sharing AP and AP2 would act as a shared AP.

For the RA-RUs, the APs 10 do not know whether or which STA 11 will transmit on the RA-RUs. Accordingly, direct control of the transmit power of random access transmissions on the RA-RUs by the APs 10 is not possible. However, the STAs 11 may have available information which enables control of the transmit power. In particular, STA1 may determine from measurements the path loss $$PL_{STA1}^{AP1}$$

and the path loss $$PL_{STA1}^{AP2}.$$

Further, STA2 may determine from measurements the path loss path loss $$PL_{STA2}^{AP1}$$

and the path loss $$PL_{STA1}^{AP2}.$$

In the scenario of FIG. 2, STA2 may thus apply the following operation to control its transmit power when transmitting in a RA-RU during CSR-based sharing of the TXOP: Initially, STA2 may measure the path losses to its surrounding APs, e.g., the path losses path loss $$PL_{STA2}^{AP1}$$

and the path loss $$PL_{STA2}^{AP2}.$$

Such measurements could be performed according to a regular schedule and/or be triggered by events, e.g., changes in signal conditions. Further, STA2 receives an indication of a level of allowed interference on the RA-RUs, e.g., in terms of a maximum interference power $I_{max}$, and an indication of the identity of the AP sharing the RA-RUs, in the illustrated example AP1. The level of allowed interference may correspond to a maximum tolerable level of interference at AP1. Then STA2 may calculate the transmit power for a random access transmission on the RA-RUs according to $$P_{TX} = I_{max} + PL_{APx}^{STA2}[dBm], \qquad (1)$$

where APx denotes the AP identified in the received indication, in the illustrated example AP1.

Then, STA2 may select one of the RA-RUs for transmission, using the random selection process as specified in the UORA scheme of the IEEE 802.11ax technology and send the random access transmission on the selected RA-RU(s) using the calculated transmit power.

It is noted that in the case of AP2 being the sharing AP and AP1 being the shared AP, STA1 could operate in a corresponding manner, then using the path loss path loss $$PL_{STA1}^{AP2}$$

to calculate the transmit power.

In some scenarios, the above operation may also consider the possibility of collisions on the RA-RUs. A collision may happen if two STAs select the same RA-RU for transmission. In the case of CSR, such collision may result in an increase of interference generated on the RA-RU, as the powers from both transmission attempts sum up. This could have the effect that the allowed level of interference is exceeded. To avoid such collision-induced exceeding of the allowed level of interference, the shared AP may indicate a power back-off to the STAs. This may be accomplished by separately indicating the power back-off, to be subtracted by the STAs from the indicated level of allowable interference when calculating the transmit power using relation (1), or by reducing the indicated level of allowed interference. In such case, the indicated level of allowed interference would correspond to the maximum tolerable level of interference on the RA-RUs minus a margin. The shared AP may dynamically set the power back-off, e.g., based on a number of STAs associated to the shared AP and/or a number of earlier attempts of random access transmissions. In some cases, the power back-off could also be controlled by the sharing AP. For example, the sharing AP may indicate the level of allowed interference on the RA-RUs to the shared AP. If the sharing AP does not know whether the shared AP use UORA, the sharing AP may indicate to the shared AP a power back-off to be selectively applied by the shared AP if the shared AP decides to signal an UORA occasion.

In some scenarios, the STA may attempt to measure the path loss to the sharing AP but fail to detect and/or decode a measurement frame from the sharing AP. Then the STA may assume that the path loss to the AP is very large. Such assumption may for example be useful if the STA is located very far from the sharing AP, so that it is unlikely that the STA would cause any interference to the sharing AP. In addition or as an alternative, the shared AP may further indicate to the STA, in addition to the level of allowed interference, a path loss measured between the shared AP and the sharing AP, in FIG. 2 denoted by $$PL_{AP2}^{AP1}.$$

When calculating the transmit power according to relation (1), the STA may then use this path loss instead of the unknown path loss between the STA and the sharing AP. The path loss between the shared AP and the sharing AP may thus be regarded as a lower bound for the path loss between the STA and the sharing AP.

In some scenarios, the STA may not be allowed to use the RA-RUs unless the STA has measured or attempted to measure the path loss to the sharing AP. This may form an incentive for the STA to perform path loss measurements with respect to its surrounding APs.

In some scenarios, the sharing AP may indicate to the shared AP whether UORA transmissions are allowed within the CSR-based sharing of the TXOP, e.g., as part of signaling in a setup phase of TXOP sharing. For example, such information could be indicated in terms of a flag.

In some scenarios, the information provided STA to enable autonomous calculation of the transmit power in a UORA occasion may be included in a trigger frame (TF) for triggering UL transmissions in the TXOP. This information may in particular include the level of allowed interference and the identity of the AP sharing the TXOP. The identity of the AP sharing the TXOP can for example be indicated as a BSS identity (BSSID) or as compressed identity, selected from a group of identities of APs that are configured to be a part of a CSR group.

The above information can be signaled per resource unit (RU) of the TXOP or per group of RUs, or for all RUs. Here, signaling the information per RU may allow for finer granularity in controlling the spatial reuse. This may in turn enable higher reuse factors compared to signaling the parameters over the entire bandwidth. In some scenarios, existing information elements of the TF defined in the IEEE 802.11ax technology may be reused to control usage of UORA by a STA. For example, the shared AP could utilize a field denoted as "UL Target Received Power" to control which STAs are allowed to utilize UORA. For example, by appropriately setting this field, the shared AP may disallow STAs that are located too close to the sharing AP to perform UORA transmissions on the shared RA-RUs. For this purpose, it can be utilized that the STA must first perform power control based on its path loss to the sharing AP and then further must ensure that the value signaled in the UL Target Received Power field is met. If the STA is located too close to the sharing AP, it will likely not be able to meet both criteria, so that the STA will be excluded from utilization of UORA on the shared RA-RUs.

Figure 3:
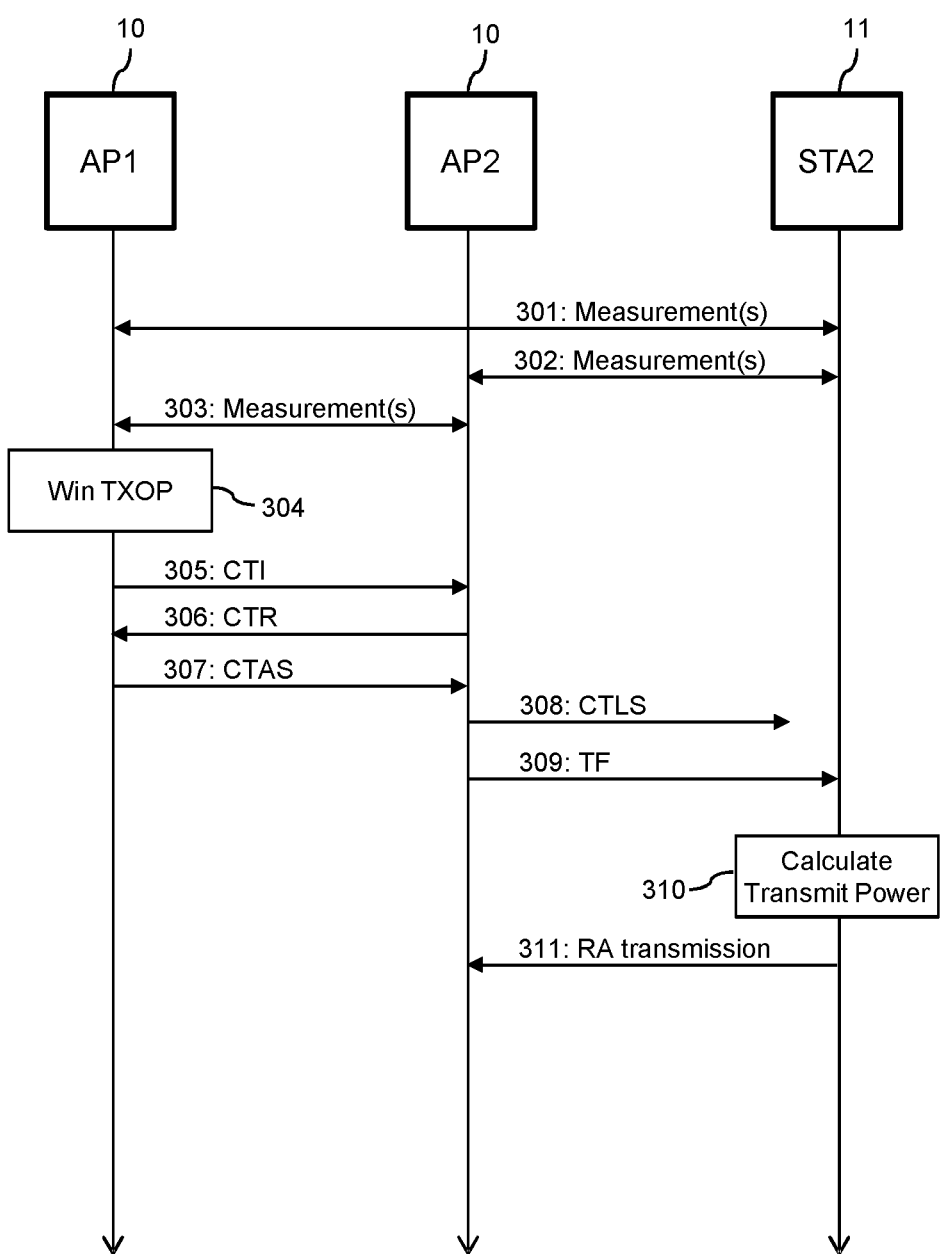
FIG. 3 schematically illustrates an example of processes according to an embodiment.

FIG. 3 shows an example of processes which are based on the above concepts of CSR-based sharing of resources for random access transmissions. The processes of FIG. 3 involve a first AP 10, denoted as AP1, a second AP 10, denoted as AP2, and a STA 11, denoted as STA2. For example, AP1, AP2, and STA2 could correspond to AP1, AP2, and STA2 in the scenario of FIG. 2. In the example of FIG. 2, it is assumed that STA2 is not yet associated to any of AP1 and AP2, but is about to associate to AP2.

As indicated by 301 and 302, STA2 initially performs measurements with respect to its surrounding APs. In particular, this involves measuring the path loss with respect to AP1 and measuring the path loss with respect to AP2. These measurements 301, 302 may be performed on the basis of measurement frames transmitted by AP1 and AP2. As further illustrated by 303, the processes of FIG. 3 may also involve performing measurements between AP1 and AP2, in particular a measurement of the path loss between AP1 and AP2. These measurements may also be based on measurement frames. For example, AP2 could perform the measurements based on measurement frames transmitted by AP1. Alternatively or in addition, at least a part of the measurements 303 could be performed by AP1 based on measurement frames transmitted by AP2, and AP1 could report the results of such measurements to AP2.

As indicated by block 304, the example of FIG. 3 involves that AP1 contends for the shared medium and wins a TXOP. AP1 then decides to share the TXOP with AP2, using CSR-based sharing for at least some resources of the TXOP, including a set of RA-RUs. Sharing of the TXOP is coordinated by setup signaling between the sharing AP, i.e., AP1, and the shared AP, i.e., AP2. In the illustrated example, the setup signaling involves that AP1 sends a CTI (CAP TXOP Indication) message to AP. The CTI frame 305 indicates to other APs that AP1 is willing to share the TXOP. AP2 then responds by sending a CTR (CAP TXOP Request) message 306 to AP1, indicating its intention to participate in sharing the TXOP. Then, AP1 proceeds by sending a CTAS (CAP TXOP Schedule) message 307 to AP2. The CTAS message 307 may inform AP2 that it is allowed to participate in the sharing of the TXOP and also indicate a TXOP start time and resources of the TXOP which are allowed to be used by AP2, including RA-RUs. Further the CTAS message 307 may also indicate the level of allowed interference on the RA-RUs. AP2 then sends a CTLS (CAP TXOP Local Schedule) message 308. By means of the CTLS message 308, AP2 may inform its associated STAs about their respective resource allocations. Since STA2 is not yet associated to AP2, it does not receive the CTLS message 308 and, thus, cannot receive a resource allocation using the CTLS message 308.

As further illustrated, AP2 sends a TF 309 to trigger UL transmissions by its associated STAs. The TF 309 also indicates the level of allowed interference on the RA-RUs of the TXOP and the identity of the sharing AP, i.e., in the illustrated example the identity of AP1. Further, the TF 309 could also indicate a lower bound for the path loss to the sharing AP, e.g., in terms of the path loss measured between AP1 and AP2.

As indicated by block 310, STA2 then calculates the transmit power to be used for a random access transmission on the RA-RUs, using the above-described principles. If STA2 does not succeed in calculating a transmit power which meets the criteria set by the information indicated in the TF frame 309, it may refrain from transmitting on the RA-RUs.

In the illustrated example it is however assumed that STA2 succeeds in calculating a transmit power which meets the set criteria and thus proceeds to send the random access transmission 311 to AP2. For this purpose, STA2 may select an RA-RU from the RA-RUs in the TXOP, using a random selection process in accordance with the UORA scheme of the IEEE 802.11ax technology. The random access transmission may for example include a management message for initiating association of STA2 to AP2.

FIG. 4 shows a flowchart for illustrating a method, which may be utilized for implementing the illustrated concepts. The method of FIG. 4 may be used for implementing the illustrated concepts in a wireless station for a wireless communication system. The wireless communication system may be based on a wireless local area network, WLAN, technology, e.g., according to the IEEE 802.11 standards family. The wireless station may for example correspond to any of the above-mentioned STAs 11, e.g., to STA2 in the examples of FIGS. 2 and 3.

If a processor-based implementation of the wireless station is used, at least some of the steps of the method of FIG. 4 may be performed and/or controlled by one or more processors of the wireless station. Such wireless station may also include a memory storing program code for implementing at least some of the below described functionalities or steps of the method of FIG. 4.

At step 410, the wireless station determines a path loss of a wireless signal path between the wireless station and a first AP. The first AP cooperates with a second AP by sharing a TXOP based on coordinated spatial reuse of at least one resource of the shared TXOP. The above-mentioned APs 10, e.g., AP1 and AP2, are examples of such APs. With respect to the sharing of the TXOP, the first AP may be a sharing AP and the second AP may be a shared AP. Accordingly, the first AP may a winner of contention for the TXOP that coordinates sharing of the TXOP with the second AP. The wireless station may be not associated or not yet associated to the second AP or to the first AP.

In some scenarios, step 410 may involve that the wireless station performs one or more measurements. The wireless station may then determine the path loss based on the one or more measurements. Further, the wireless station could determine the path loss based on a lower bound of the path loss. In particular, in response to failure to determine the path loss based on the one or more measurements, the wireless station determining the path loss to correspond to the lower bound. The lower bound may be indicated by the second AP and may depend on a path loss of a wireless signal path between the first AP and the second AP point.

At step 420, the wireless station receives, from the second AP, an indication of a level of allowed interference on the at least one resource of the shared TXOP. The at least one resource may for example correspond to or include a set of RA-RUs. The level of allowed interference may be based on a maximum tolerable level of interference at the first AP.

In some scenarios, step 420 may also involve receiving one or more further indications from the second AP. For example, the wireless station could receive an indication of an identity of the first AP. Further, the wireless station could receive an indication of a lower bound of the path loss to the first AP. Still further, the wireless station could receive an indication of resources of the TXOP, e.g., an indication of RA-RUs.

The wireless station may receive the indications of step 420 in a trigger message for triggering one or more wireless transmissions in the shared TXOP, e.g., in a TF, such as the above-mentioned TF 309.

At step 430, the wireless station controls a transmit power of at least one wireless random access transmission performed on the at least one resource of the shared TXOP from the wireless station to the second AP. This is accomplished based on the path loss determined at step 410 and the indication of the level of allowed interference received at step 420. For performing the wireless random access transmission, the wireless station may randomly selects the at least one resource from the shared TXOP. The random selection of the at least one resource of the shared TXOP is based on a random backoff and a contention window, e.g., like in the UORA scheme defined in the IEEE 802.11ax technology.

Figure 5:
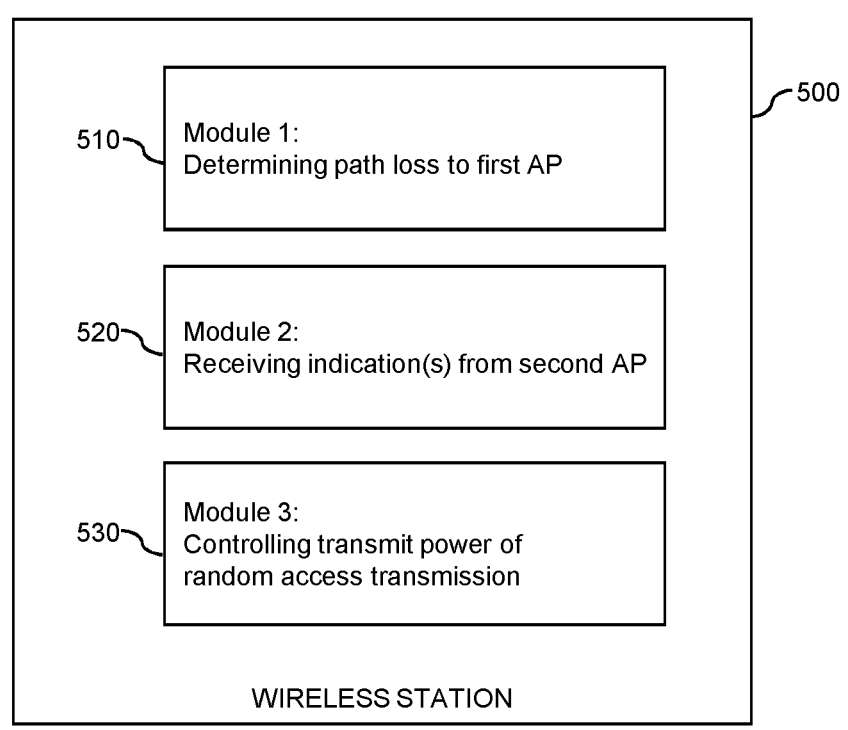
FIG. 5 shows a block diagram for schematically illustrating functionalities of a wireless station according to an embodiment.

FIG. 5 shows a block diagram for illustrating functionalities of a wireless station 500 which operates according to the method of FIG. 4. The wireless station 500 may for example correspond to one of above-mentioned STAs 11. As illustrated, the wireless station 500 may be provided with a module 510 configured to determine a path loss to a first AP, such as explained in connection with step 410. Further, the wireless station 500 may be provided with a module 520 configured to receive one or more indications from a second AP, such as explained in connection with step 420. Further, the wireless station 500 may be provided with a module 530 configured to control transmit power of a wireless random access transmission, such as explained in connection with step 430.

It is noted that the wireless station 500 may include further modules for implementing other functionalities, such as known functionalities of a WLAN STA. Further, it is noted that the modules of the wireless station 500 do not necessarily represent a hardware structure of the wireless station 500, but may also correspond to functional elements, e.g., implemented by hardware, software, or a combination thereof.

Figure 6:
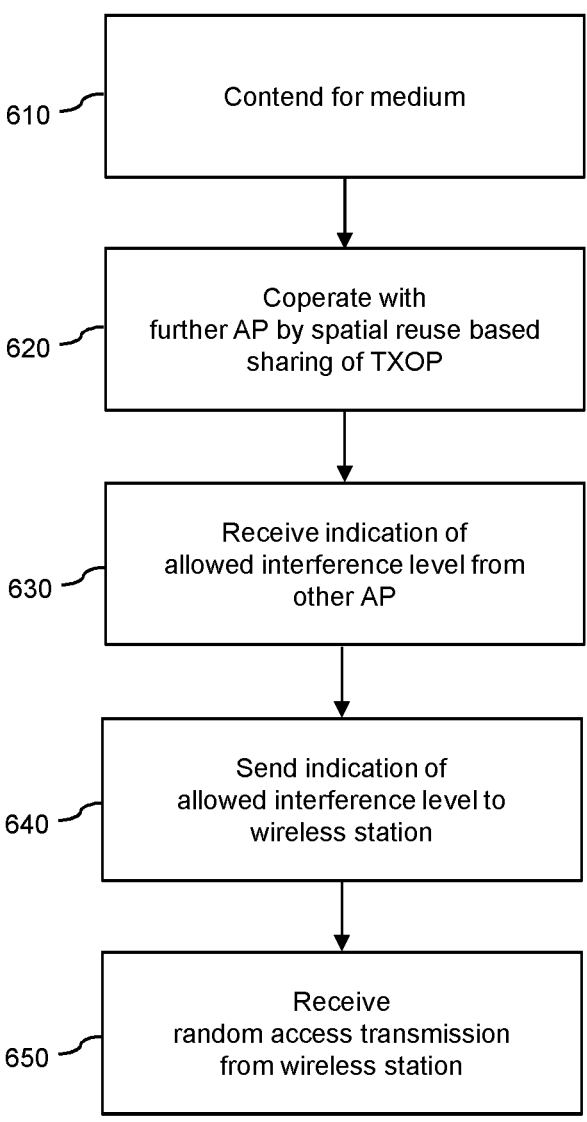
FIG. 6 shows a flowchart for schematically illustrating a method according to a further embodiment.

FIG. 6 shows a flowchart for illustrating a method, which may be utilized for implementing the illustrated concepts. The method of FIG. 6 may be used for implementing the illustrated concepts in an AP for a wireless communication system, in particular in an AP operating as a shared AP. The wireless communication system may be based on a wireless local area network, WLAN, technology, e.g., according to the IEEE 802.11 standards family. The AP may for example correspond to any of the above-mentioned APs 10, e.g., to AP2 in the examples of FIGS. 2 and 3.

If a processor-based implementation of the AP is used, at least some of the steps of the method of FIG. 6 may be performed and/or controlled by one or more processors of the AP. Such AP may also include a memory storing program code for implementing at least some of the below described functionalities or steps of the method of FIG. 6.

At step 610, the AP may contend for access to a medium. This may involve performing CCA (Clear Channel Assessment) or LBT (Listen Before Talk) procedure to assess whether the medium is occupied. The CCA or LBT procedure may be based on a contention window which is extended with each unsuccessful access attempt. In some scenarios, the AP may win the contention for access to the medium. In other scenarios, a further AP of the wireless communication system may win the contention for access to the medium. Such further AP may for example correspond to any of the above-mentioned APs.

At step 620, in response to a further AP gaining access to the medium, the AP cooperates with the other AP by sharing at least one resource of the TXOP. The sharing of the TXOP is based on spatial reuse, in particular coordinated spatial reuse of the at least one radio resource of the TXOP. The shared radio resource(s) may for example correspond to or include RA-RUs. With respect to the sharing of the TXOP, the AP may be a shared AP and the further AP may be a sharing AP. Accordingly, the further AP may a winner of contention for the TXOP that coordinates sharing of the TXOP with the AP.

At step 630, the access point receives, from the further AP, an indication of a first level of allowed interference on the at least one resource of the shared TXOP. The first level of allowed interference may be a maximum tolerable level of interference at the further AP.

In some scenarios, step 630 may also involve receiving one or more further indications from the further AP. For example, the AP could receive an indication that wireless random access transmissions on the at least one resource of the shared TXOP are allowed and/or an indication of an identity of the further AP.

At step 640, the AP sends, to a wireless station, an indication of a second level of allowed interference on the at least one resource of the shared TXOP. This is accomplished based on the first level of allowed interference received at step 630. The wireless station may correspond to any of the above-mentioned STAs 11, e.g., to STA2 in the examples of FIGS. 2 and 3. The wireless station may be not associated or not yet associated to the AP or to the further AP. The second level of allowed interference is to be applied by the wireless station in controlling a wireless random access transmission on the at least one resource of the shared TXOP, in particular in controlling transmit power of the at least one wireless random access transmission.

The second level of allowed interference may be equal to the first level of allowed interference or correspond to the first level of allowed interference minus a margin.

In some scenarios, if at step 630 the AP receives an indication that wireless random access transmissions on the at least one resource of the shared TXOP are allowed, the AP may send the indication of the second level of allowed interference in response to the indication that wireless random access transmissions on the at least one resource of the shared TXOP are allowed.

In some scenarios, step 640 may also involve sending one or more further indications to the wireless station. For example, the AP could send an indication of an identity of the further AP. Further, the AP could send an indication of a lower bound of a path loss between the wireless station and the further AP. Such lower bound may be based on a path loss between the AP and the further AP. The AP may then perform one or more measurements to determine the path loss of the wireless signal path between the further AP and the AP and/or determine the path loss of the wireless signal path between the further AP and the AP based on one or more measurement reports from the further AP.

Still further, the wireless station could receive an indication of resources of the TXOP, e.g., an indication of RA-RUs.

The AP may send the indications of step 640 in a trigger message for triggering one or more wireless transmissions in the shared TXOP, e.g., in a TF, such as the above-mentioned TF 309.

At step 650, the AP receives, from the wireless station, at least one wireless random access transmission performed on the at least one resource of the shared TXOP. A transmit power of the at least one wireless random access transmission depends on the indicated second level of allowed interference. Further, the transmit power may be based on one or more measurements performed by the wireless station to determine a path loss of a wireless signal path between the wireless station and the further access point. In some cases, the transmit power may be further based on a lower bound of the path loss, e.g., as optionally indicated at step 640. The lower bound may depends on a path loss of a wireless signal path between the further access point and the access point.

The at least one resource of the shared TXOP, on which the AP receives the at least one wireless random access transmission, may be randomly selected by the wireless station. The random selection of the at least one resource of the shared TXOP may be based on a random backoff and a contention window, e.g., like in the UORA scheme defined in the IEEE 802.11ax technology.

Figure 7:
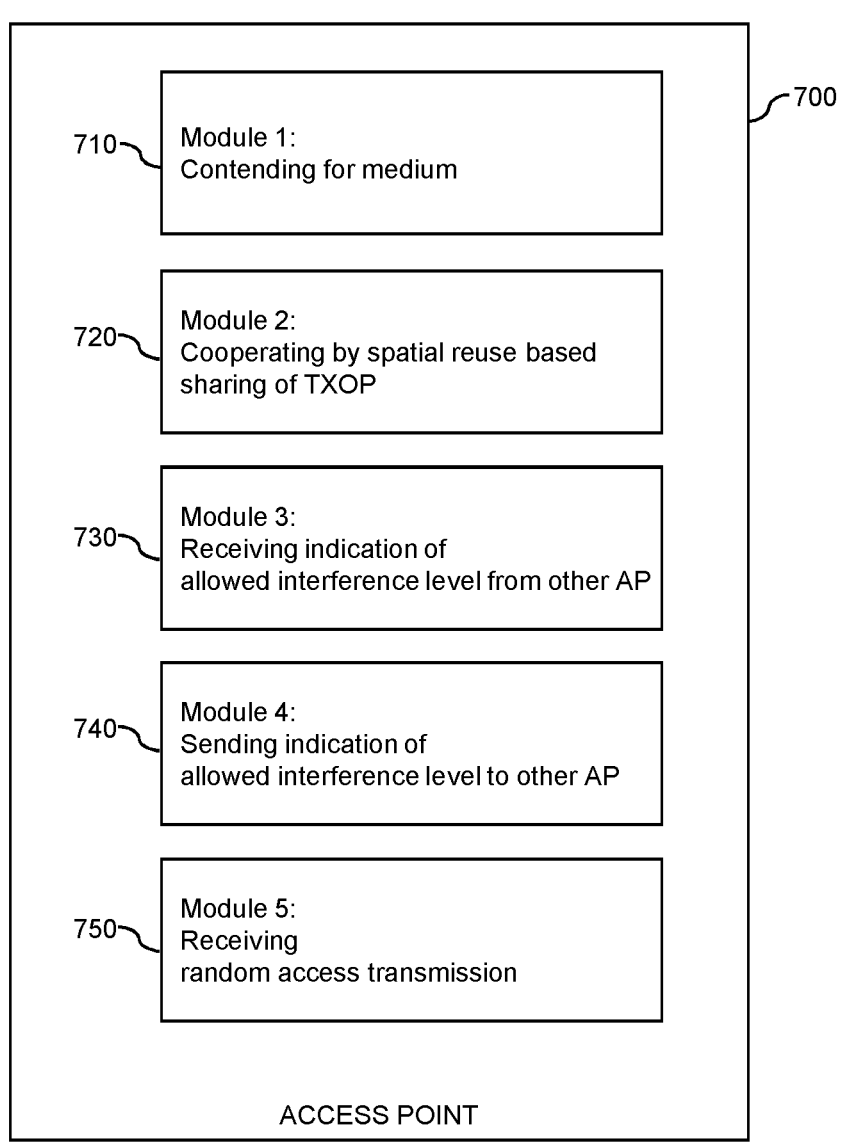
FIG. 7 shows a block diagram for schematically illustrating functionalities of an AP according to an embodiment.

FIG. 7 shows a block diagram for illustrating functionalities of an AP 700 which operates according to the method of FIG. 6. The AP 700 may for example correspond to one of above-mentioned APs 10, e.g., to AP2 in the examples of FIGS. 2 and 3. As illustrated, the AP 700 may be provided with a module 710 configured to contend for a medium, such as explained in connection with step 610. Further, the AP 700 may be provided with a module 720 configured to cooperate with a further AP by sharing a TXOP based on spatial reuse, such as explained in connection with step 620. Further, the AP 700 may be provided with a module 730 configured to receive one or more indications from the further AP, such as explained in connection with step 630. Further, the AP 700 may be provided with a module 740 configured to send one or more indications to a wireless station, such as explained in connection with step 640. Further, the AP 700 may be provided with a module 750 configured to receive a wireless random access transmission from the wireless station, such as explained in connection with step 650.

It is noted that the AP 700 may include further modules for implementing other functionalities, such as known functionalities of a WLAN AP. Further, it is noted that the modules of the AP 700 do not necessarily represent a hardware structure of the AP 700, but may also correspond to functional elements, e.g., implemented by hardware, software, or a combination thereof.

Figure 8:
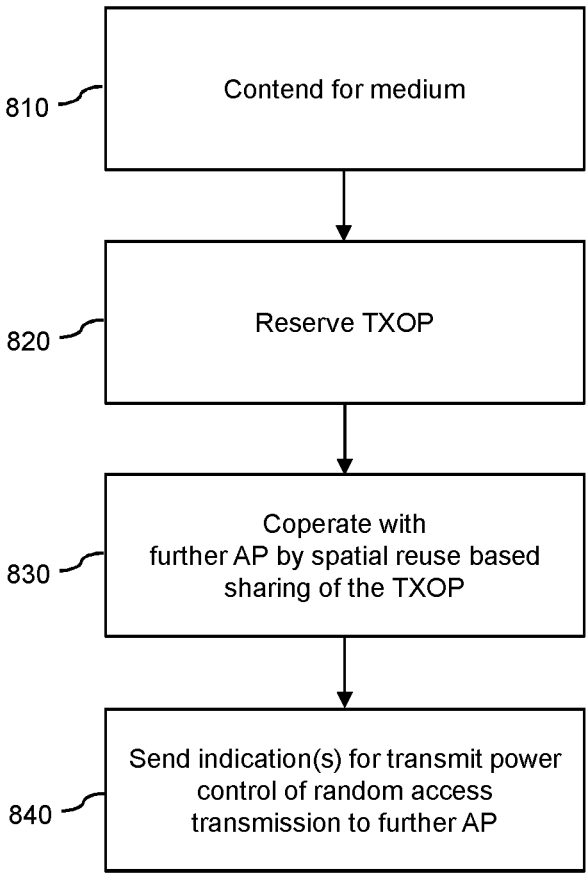
FIG. 8 shows a flowchart for schematically illustrating a method according to a further embodiment.

FIG. 8 shows a flowchart for illustrating a method, which may be utilized for implementing the illustrated concepts. The method of FIG. 8 may be used for implementing the illustrated concepts in an AP for a wireless communication system, in particular in an AP which operates as a sharing AP. The wireless communication system may be based on a wireless local area network, WLAN, technology, e.g., according to the IEEE 802.11 standards family. The AP may for example correspond to any of the above-mentioned APs 10, e.g., to AP1 in the examples of FIGS. 2 and 3.

If a processor-based implementation of the AP is used, at least some of the steps of the method of FIG. 8 may be performed and/or controlled by one or more processors of the AP. Such AP may also include a memory storing program code for implementing at least some of the below described functionalities or steps of the method of FIG. 8.

At step 810, the AP contends for access to a medium. This may involve performing a CCA or LBT procedure to assess whether the medium is occupied. The CCA or LBT procedure may be based on a contention window which is extended with each unsuccessful access attempt. In some scenarios, the AP may win the contention for access to the medium. In other scenarios, another AP may win the contention for access to the medium.

At step 820, in response to gaining access to the medium, the AP reserves a TXOP on the medium. This may for example be accomplished by sending a message on the medium which indicates a duration of the reservation. In the examples of FIG. 3 the CTI message 305 may also cause reservation of the TXOP.

At step 830, the AP cooperates with a further APs of the wireless communication system by sharing at least one resource of the TXOP. The sharing of the TXOP is based on spatial reuse, in particular coordinated spatial reuse of the at least one resource. The shared radio resource(s) may for example correspond to or include RA-RUs.

At step 840, the AP sends, to the further AP, an indication of a level of allowed interference on the at least one resource of the shared TXOP. The level of allowed interference may be a maximum tolerable level of interference at the AP. The indicated level of allowed interference has the purpose of being applied in controlling transmit power a wireless random access transmission on the at least one resource of the shared TXOP from a wireless station to the further access point. The wireless station may correspond to any of the above-mentioned STAs 11, e.g., to STA2 in the examples of FIGS. 2 and 3. The wireless station may be not associated or not yet associated to the AP or to the further AP.

In some scenarios, step 840 may also involve sending one or more further indications to the further AP. For example, the AP could send an indication that wireless random access transmissions on the at least one resource of the shared TXOP are allowed and/or an indication of the identity of the AP.

Further, the AP could perform one or more measurements to determine a path loss of a wireless signal path between the further access point and the access point and could then send on one or more measurement reports indicating the determined path loss to the further AP.

Figure 9:
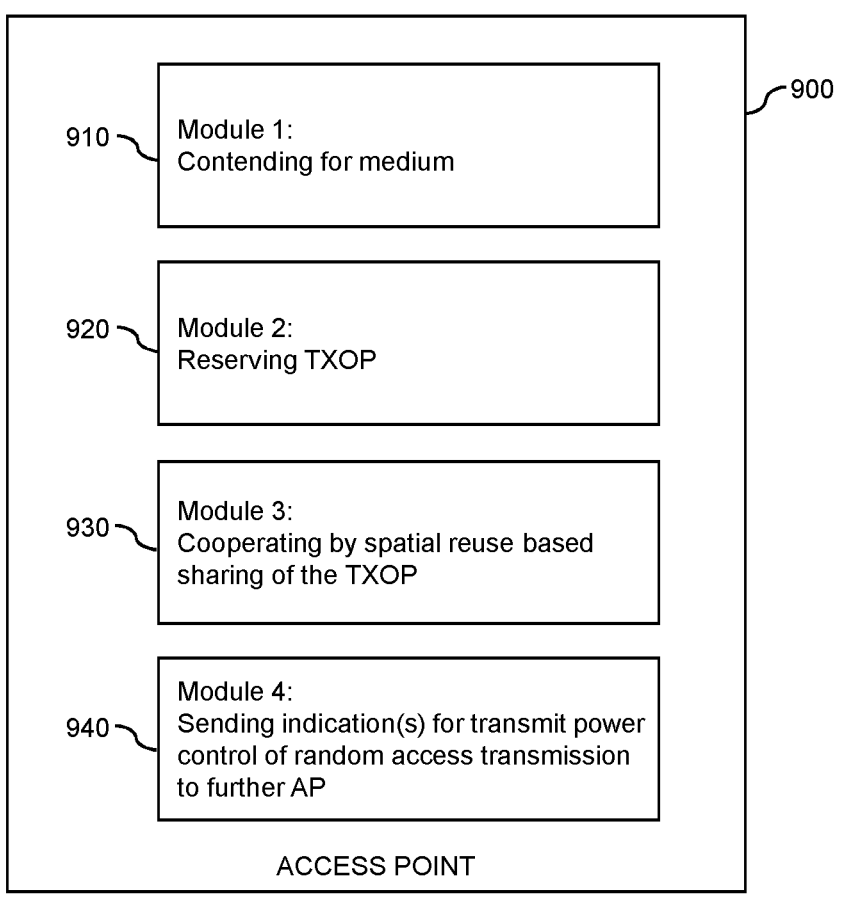
FIG. 9 shows a block diagram for schematically illustrating functionalities of an AP according to a further embodiment.

FIG. 9 shows a block diagram for illustrating functionalities of an AP 900 which operates according to the method of FIG. 8. The AP 900 may for example correspond to one of above-mentioned APs 10, e.g., to AP1 in the examples of FIGS. 2 and 3. As illustrated, the AP 900 may be provided with a module 910 configured to contend for a medium, such as explained in connection with step 810. Further, the AP 900 may be provided with a module 920 configured to reserve a TXOP on the medium, such as explained in connection with step 820. Further, the AP 900 may be provided with a module 930 configured to cooperate with a further by sharing a TXOP based on spatial reuse, such as explained in connection with step 830. Further, the AP 900 may be provided with a module 940 configured to send one or more indications for transmit power control of a wireless random access transmission to the further AP, such as explained in connection with step 840.

It is noted that the AP 800 may include further modules for implementing other functionalities, such as known functionalities of a WLAN AP. Further, it is noted that the modules of the AP 800 do not necessarily represent a hardware structure of the AP 800, but may also correspond to functional elements, e.g., implemented by hardware, software, or a combination thereof.

It is noted that the functionalities as described in connection with FIGS. 4 to 9 could also be implemented in a system, e.g., a system including an AP operating as sharing AP according to the method of FIG. 8 and one or more further APs operating as shared APs according to the method of FIG. 6. Further, such system could include one or more wireless stations operating according to the method of FIG. 4.

Figure 10:
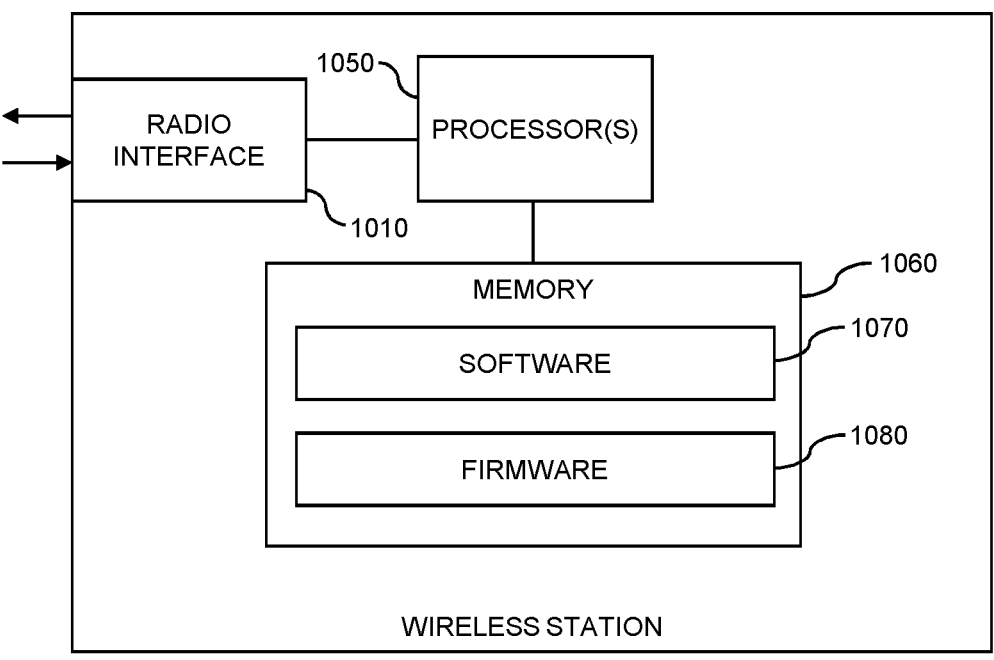
FIG. 10 schematically illustrates structures of a wireless station according to an embodiment.

FIG. 10 illustrates a processor-based implementation of a wireless station 1000 which may be used for implementing the above-described concepts. For example, the structures as illustrated in FIG. 10 may be used for implementing the concepts in any of the above-mentioned STAs 11, e.g., STA2 in the examples of FIGS. 2 and 3.

As illustrated, the wireless station 1000 includes one or more radio interfaces 1010. The radio interface(s) 1010 may for example be based on a WLAN technology, e.g., according to an IEEE 802.11 family standard. However, other wireless technologies could be supported as well, e.g., the LTE technology or the NR technology. In some scenarios, the radio interface(s) 1010 may be based on multiple antennas of the wireless station and support beamformed multi-antenna port transmission to enable spatial multiplexing of wireless transmissions.

Further, the wireless station 1000 may include one or more processors 1050 coupled to the radio interface(s) 1010 and a memory 1060 coupled to the processor(s) 1050. By way of example, the radio interface(s) 1010, the processor(s) 1050, and the memory 1060 could be coupled by one or more internal bus systems of the wireless station 1000. The memory 1060 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1060 may include software 1070 and/or firmware 1080. The memory 1060 may include suitably configured program code to be executed by the processor(s) 1050 so as to implement the above-described functionalities for controlling transmit power of a CSR-based random access transmission, such as explained in connection with FIG. 4.

It is to be understood that the structures as illustrated in FIG. 10 are merely schematic and that the wireless station 1000 may actually include further components which, for the sake of clarity, have not been illustrated, e.g., further interfaces or further processors. Also, it is to be understood that the memory 1060 may include further program code for implementing known functionalities of a WLAN STA. According to some embodiments, also a computer program may be provided for implementing functionalities of the wireless station 1000, e.g., in the form of a physical medium storing the program code and/or other data to be stored in the memory 1060 or by making the program code available for download or by streaming.

Figure 11:
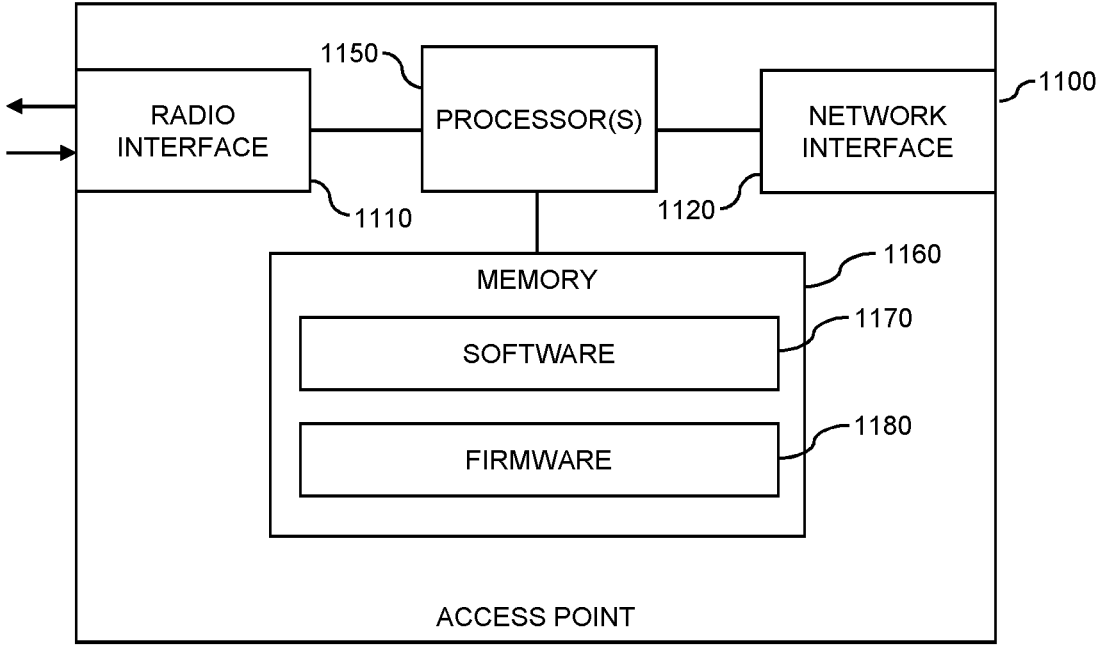
FIG. 11 schematically illustrates structures of an AP according to an embodiment.

FIG. 11 illustrates a processor-based implementation of an AP 1100 which may be used for implementing the above-described concepts. For example, the structures as illustrated in FIG. 11 may be used for implementing the concepts in any of the above-mentioned APs 10, e.g., in AP1 or AP2 in the examples of FIGS. 2 and 3.

As illustrated, the AP 1100 includes one or more radio interfaces 1110. The radio interface(s) 1110 may for example be based on a WLAN technology, e.g., according to an IEEE 802.11 family standard. However, other wireless technologies could be supported as well, e.g., the LTE technology or the NR technology. In some scenarios, the radio interface(s) 1110 may be based on multiple antennas of the AP 1100 and support beamformed multi-antenna port transmission to enable spatial multiplexing of wireless transmissions. As further illustrated, the AP 1100 may also include one or more network interfaces 1120 which may be used for communication with other nodes of a wireless communication network, e.g., with other APs or with an application service platform as illustrated in FIG. 1.

Further, the AP 1100 may include one or more processors 1150 coupled to the interface(s) 1110, 1120 and a memory 1160 coupled to the processor(s) 1150. By way of example, the interface(s) 1110, 1120, the processor(s) 1150, and the memory 1160 could be coupled by one or more internal bus systems of the AP 1100. The memory 1160 may include a ROM, e.g., a flash ROM, a RAM, e.g., a DRAM or SRAM, a mass storage, e.g., a hard disk or solid state disk, or the like. As illustrated, the memory 1160 may include software 1170 and/or firmware 1180. The memory 1160 may include suitably configured program code to be executed by the processor(s) 1150 so as to implement the above-described functionalities for controlling transmit power of a CSR-based random access transmission, such as explained in connection with FIG. 6 or FIG. 8.

It is to be understood that the structures as illustrated in FIG. 11 are merely schematic and that the AP 1100 may actually include further components which, for the sake of clarity, have not been illustrated, e.g., further interfaces or further processors. Also, it is to be understood that the memory 1160 may include further program code for implementing known functionalities of a WLAN AP. According to some embodiments, also a computer program may be provided for implementing functionalities of the AP 1100, e.g., in the form of a physical medium storing the program code and/or other data to be stored in the memory 1160 or by making the program code available for download or by streaming.

As can be seen, the concepts as described above may be used for efficient utilization of spatial reuse for transmission of random access transmissions on shared resources. For example, the concepts may enable using UORA in a CSR-framework. The concepts may be implemented in an efficient manner, without requiring excessive modification of existing TXOP sharing mechanisms, e.g., concerning TXOP sharing setup signaling. Excessive signaling of path loss values can be avoided.

It is to be understood that the examples and embodiments as explained above are merely illustrative and susceptible to various modifications. For example, the illustrated concepts may be applied in connection with various kinds of wireless technologies, without limitation to WLAN technologies. Further, the concepts may be applied with respect to various types of APs and STAs. Still further, the illustrated concepts may be extended to various numbers of APs cooperating in the sharing of the TXOP. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

EMBODIMENTS

In view of the above, embodiments provided in the present disclosure include:

Embodiment 1

A method of controlling wireless communication in a wireless communication system, the method comprising:

a wireless station (11; 1000) determining a path loss of a wireless signal path between the wireless station (11; 1000) and a first access point (10; 1100), the first access point (10; 1100) cooperating with a second access point (10; 1100) by sharing a transmit opportunity, TXOP, based on coordinated spatial reuse of at least one resource of the shared TXOP;

the wireless station (11; 1000) receiving, from the second access point (10; 1100), an indication of a level of allowed interference on the at least one resource of the shared TXOP;

based on the determined path loss and the indication of the level of allowed interference, the wireless station (11; 1000) controlling a transmit power of at least one wireless random access transmission (311) performed on the at least one resource of the shared TXOP from the wireless station (11; 1000) to the second access point (10; 1100).

Embodiment 2

The method according to embodiment 1, comprising:
the wireless station (11; 1000) receiving, from the second access point (10; 1100), an indication of an identity of the first access point (10; 1100).

Embodiment 3

The method according to embodiment 1 or 2, comprising:
the wireless station (11; 1000) performing one or more measurements; and the wireless station (11; 1000) determining the path loss based on the one or more measurements.

Embodiment 4

The method according to embodiment 3, comprising:
the wireless station (11; 1000) receiving, from the second access point (10; 1100), an indication of a lower bound of the path loss; and
in response to failure to determine the path loss based on the one or more measurements, the wireless station (11; 1000) determining the path loss to correspond to the lower bound.

Embodiment 5

The method according to embodiment 4,
wherein the lower bound depends on a path loss of a wireless signal path between the first access point and the second access point.

Embodiment 6

The method according to any one of embodiments 1 to 5, comprising:
the wireless station (11; 1000) receiving, from the second access point (10; 1100), an indication of resources of the shared TXOP.

Embodiment 7

The method according to any one of embodiments 2 to 6, wherein the wireless station (11; 1000) receives the indication of the lower bound, the indication of the resources, and/or the indication of the identity of the first access point (10; 1100) in a trigger message (309) for triggering one or more wireless transmissions in the shared TXOP.

Embodiment 8

The method according to any one of embodiments 1 to 7, wherein the level of allowed interference is based on a maximum tolerable level of interference at the first access point (10; 1100).

Embodiment 9

The method according to any one of embodiments 1 to 8, wherein the wireless station (11; 1000) randomly selects the at least one resource from the shared TXOP.

Embodiment 10

The method according to embodiment 9, wherein the random selection of the at least one resource of the shared TXOP is based on a random backoff and a contention window.

Embodiment 11

The method according to any one embodiments 1 to 10, wherein the first access point (10; 1100) is a winner of contention for the TXOP that coordinates sharing of the TXOP with the second access point (10; 1100).

Embodiment 12

The method according to any one of embodiments 1 to 11, wherein the wireless station (11; 1000) is not associated to the second access point (10; 1100).

Embodiment 13

The method according to any one of embodiments 1 to 12, wherein the wireless communication system is based on a Wireless Local Area Network technology according to the IEEE 802.11 standards family.

Embodiment 14

A method of controlling wireless communication in a wireless communication system, the method comprising:
  an access point (10; 1100) of the wireless communication system cooperating with a further access point (10; 1100) of the wireless communication system by sharing a transmit opportunity, TXOP, based on coordinated spatial reuse of at least one resource of the shared TXOP;
  the access point (10; 1100) receiving, from the further access point (10; 1100), an indication of a first level of allowed interference on the at least one resource of the shared TXOP;
  based on the first level of allowed interference, the access point (10; 1100) sending, to a wireless station (11; 1000), an indication of a second level of allowed interference on the at least one resource of the shared TXOP, to be applied by the wireless station (11; 1000) in controlling a wireless random access transmission on the at least one resource of the shared TXOP; and
  the access point (10; 1100) receiving, from the wireless station (11; 1000), at least one wireless random access transmission (311) performed on the at least one resource of the shared TXOP, a transmit power of the at least one wireless random access transmission (311) depending on the indicated second level of allowed interference.

Embodiment 15

The method according to embodiment 14, comprising:
  the access point (10; 1100) sending, to the wireless station (11; 1000), an indication of an identity of the further access point (10; 1100).

Embodiment 16

The method according to embodiment 14 or 15, comprising:
  wherein the transmit power is further based on one or more measurements performed by the wireless station (11; 1000) to determine a path loss of a wireless signal path between the wireless station (11; 1000) and the further access point (10; 1100).

Embodiment 17

The method according to embodiment 16, comprising:
  the access point (10; 1100) sending, to the wireless station (11; 1000), an indication of a lower bound of the path loss,
  wherein the transmit power is further based on the indicated lower bound.

Embodiment 18

The method according to embodiment 17, wherein the lower bound depends on a path loss of a wireless signal path between the further access point (10; 1100) and the access point (10; 1100).

Embodiment 19

The method according to embodiment 18, comprising:
  the access point (10; 1100) performing one or more measurements to determine the path loss of the wireless signal path between the further access point (10; 1100) and the access point (10; 1100).

Embodiment 20

The method according to embodiment 19, comprising:
  the access point (10; 1100) determining the path loss of the wireless signal path between the further access point (10; 1100) and the access point (10; 1100) based on one or more measurement reports from the further access point (10; 1100).

Embodiment 21

The method according to any one of embodiments 14 to 20, comprising:
  the access point (10; 1100) sending, to the wireless station (11; 1000), an indication of resources of the shared TXOP.

Embodiment 22

The method according to any one of embodiments 15 to 21,
- wherein the access point (10; 1100) sends the indication of the second level of allowed interference, the indication of the lower bound, the indication of the at least one resource, and/or the indication of the identity of the further access point in a trigger message (309) for triggering one or more wireless transmissions in the shared TXOP.

Embodiment 23

The method according to any one of embodiments 14 to 22,
- wherein the first level of allowed interference is a maximum tolerable level of interference at the further access point (10; 1100).

Embodiment 24

The method according to any one of embodiments 14 to 23,
- wherein the second level of allowed interference corresponds to the first level of allowed interference minus a margin.

Embodiment 25

The method according to any one of embodiments 14 to 24,
- wherein the at least one resource of the shared TXOP, on which the access point (10; 1100) receives the at least one wireless random access transmission (311), is randomly selected by the wireless station (11; 1000).

Embodiment 26

The method according to embodiment 25,
- wherein the random selection of the at least one resource of the shared TXOP is based on a random backoff and a contention window.

Embodiment 27

The method according to any one of embodiments 14 to 26, comprising:
- the access point (10; 1100) receiving, from the further access point (10; 1100), an indication that wireless random access transmissions on the at least one resource of the shared TXOP are allowed; and
- the access point (10; 1100) sending the indication of the second level of allowed interference in response to the indication that wireless random access transmissions on the at least one resource of the shared TXOP are allowed.

Embodiment 28

The method according to any one of the embodiments 14 to 27,
- wherein the further access point (10; 1100) is a winner of contention for the TXOP that coordinates sharing of the TXOP with the access point (10; 1100).

Embodiment 29

The method according to any one of embodiments 14 to 28,
- wherein the wireless station (11; 1000) is not associated to the access point (10; 1100).

Embodiment 30

The method according to any one of embodiments 14 to 29,
- wherein the wireless communication system is based on a Wireless Local Area Network technology according to the IEEE 802.11 standards family.

Embodiment 31

A method of controlling wireless communication in a wireless communication system, the method comprising:
- an access point (10; 1100) of the wireless communication system cooperating with a further access point (10; 1100) of the wireless communication system by sharing a transmit opportunity, TXOP, based on coordinated spatial reuse of at least one resource of the shared TXOP; and
- the access point (10; 1100) sending, to the further access point (10; 1100), an indication of a level of allowed interference on the at least one resource of the shared TXOP, to be applied in controlling transmit power a wireless random access transmission (311) on the at least one resource of the shared TXOP from a wireless station (11; 1000) to the further access point (10; 1100).

Embodiment 32

The method according to embodiment 31, comprising:
- the access point (10; 1100) sending, to the further access point (10; 1100), an indication that wireless random access transmissions on the at least one resource of the shared TXOP are allowed.

Embodiment 33

The method according to embodiment 31 or 32, comprising:
- the access point (10; 1100) performing one or more measurements to determine a path loss of the wireless signal path between the further access point (10; 1100) and the access point (10; 1100).

Embodiment 34

The method according to embodiment 32, comprising:
- the access point (10; 1100) sending on one or more measurement reports indicating the determined path loss to the further access point (10; 1100).

Embodiment 35

The method according to any one of embodiments 32 to 34,
- wherein the level of allowed interference is a maximum tolerable level of interference at the access point (10; 1100).

Embodiment 36

The method according to any one of the embodiments 31 to 35,
wherein the access point (10; 1100) is a winner of contention for the TXOP that coordinates sharing of the TXOP with the further access point (10; 1100).

Embodiment 37

The method according to any one of embodiments 31 to 36,
wherein the wireless station (11; 1000) is not associated to the further access point (10; 1100).

Embodiment 38

The method according to any one of embodiments 31 to 37,
wherein the wireless communication system is based on a Wireless Local Area Network technology according to the IEEE 802.11 standards family.

Embodiment 39

A wireless station (11; 1000) for operation in a wireless communication system, the wireless station (11; 1000) being configured to:
determine a path loss of a wireless signal path between the wireless station (11; 1000) and a first access point (10; 1100), the first access point (10; 1100) cooperating with a second access point (10; 1100) by sharing a transmit opportunity, TXOP, based on coordinated spatial reuse of at least one resource of the shared TXOP;
receive, from the second access point (10; 1100), an indication of a level of allowed interference on the at least one resource of the shared TXOP;
based on the determined path loss and the indication of the level of allowed interference, control a transmit power of at least one wireless random access transmission (311) performed on the at least one resource of the shared TXOP from the wireless station (11; 1000) to the second access point (10; 1100).

Embodiment 40

The wireless station (11; 1000) according to embodiment 39,
wherein the wireless station (11; 1000) is configured to perform a method according to any one of embodiments 2 to 13.

Embodiment 41

The wireless station (11; 1000) according to embodiment 39 or 40, comprising:
at least one processor (1050), and
a memory (1060) containing program code executable by the at least one processor (1050), whereby execution of the program code by the at least one processor (1050) causes the wireless station (11; 1000) to perform a method according to any one of embodiments 1 to 13.

Embodiment 42

An access point (10; 1100) for a wireless communication system, the access point (10; 1100) being configured to:
cooperate with a further access point (10; 1100) of the wireless communication system by sharing a transmit opportunity, TXOP, based on coordinated spatial reuse of at least one resource of the shared TXOP;
receive, from the further access point (10; 1100), an indication of a first level of allowed interference on the at least one resource of the shared TXOP;
based on the first level of allowed interference, send, to a wireless station (11; 1000), an indication of a second level of allowed interference on the at least one resource of the shared TXOP, to be applied by the wireless station (11; 1000) in controlling a wireless random access transmission (311) on the at least one resource of the shared TXOP; and
receive, from the wireless station (11; 1000), at least one wireless random access transmission performed on the at least one resource of the shared TXOP, a transmit power of the at least one wireless transmission (311) depending on the indicated second level of allowed interference.

Embodiment 43

The access point (10; 1100) according to embodiment 42,
wherein the access point (10; 1100) is configured to perform a method according to any one of embodiments 14 to 30.

Embodiment 44

The access point (10; 1100) according to embodiment 42 or 43, comprising:
at least one processor (1150), and
a memory (1160) containing program code executable by the at least one processor (1150), whereby execution of the program code by the at least one processor (1150) causes the access point (10; 1100) to perform a method according to any one of embodiments 14 to 30.

Embodiment 45

An access point (10; 1100) for a wireless communication system, the access point (10; 1100) being configured to:
cooperate with a further access point (10; 1100) of the wireless communication system by sharing a transmit opportunity, TXOP, based on coordinated spatial reuse of at least one resource of the shared TXOP; and
send, to the further access point (10; 1100), an indication of a level of allowed interference on the at least one resource of the shared TXOP, to be applied in controlling transmit power a wireless random access transmission (311) on the at least one resource of the shared TXOP from a wireless station (11; 1000) to the further access point (10; 1100).

Embodiment 46

The access point (10; 1100) according to embodiment 45,
wherein the access point (10; 1100) is configured to perform a method according to any one of embodiments 32 to 38.

Embodiment 47

The access point (10; 1100) according to embodiment 45 or 46, comprising:
at least one processor (1150), and a memory (1160) containing program code executable by the at least one processor (1150), whereby execution of the program code by the at least one processor (1150) causes the access point (10; 1100) to perform a method according to any one of embodiments 31 to 38.

Embodiment 48

A computer program or computer program product comprising program code to be executed by at least one processor (1050) of a wireless station (11; 1000), whereby execution of the program code causes the wireless station (11; 1000) to perform a method according to any one of embodiments 1 to 13.

Embodiment 49

A computer program or computer program product comprising program code to be executed by at least one processor (1150) of an access point (10; 1100), whereby execution of the program code causes the access point (10; 1100) to perform a method according to any one of embodiments 14 to 38.

The invention claimed is:

1. A method of controlling wireless communication in a wireless communication system, performed by a wireless station, the method comprising:
   determining a path loss of a wireless signal path between the wireless station and a first access point, the first access point cooperating with a second access point by sharing a transmit opportunity (TXOP) based on coordinated spatial reuse of at least one resource of the shared TXOP;
   receiving, from the second access point, an indication of a level of allowed interference on the at least one resource of the shared TXOP; and
   controlling, based on the determined path loss and the indication of the level of allowed interference, a transmit power of at least one wireless random access transmission performed on the at least one resource of the shared TXOP from the wireless station to the second access point.

2. The method of claim 1, further comprising the receiving, from the second access point, an indication of an identity of the first access point.

3. The method of claim 1, further comprising:
   performing, one or more measurements; and
   determining the path loss based on the one or more measurements.

4. The method of claim 3, further comprising:
   receiving, from the second access point, an indication of a lower bound of the path loss; and
   determining the path loss to correspond to the lower bound in response to a failure to determine the path loss based on the one or more measurements.

5. The method of claim 4, wherein the lower bound depends on a path loss of a wireless signal path between the first access point and the second access point.

6. The method of claim 1, further comprising receiving, from the second access point, an indication of resources of the shared TXOP.

7. The method of claim 4, further comprising receiving the indication of the lower bound of the path loss, an indication of resources of the shared TXOP, and/or the indication of an identity of the first access point in a trigger message for triggering one or more wireless transmissions in the shared TXOP.

8. The method of claim 1, wherein the level of allowed interference is based on a maximum tolerable level of interference at the first access point.

9. The method of claim 1, further comprising selecting randomly the at least one resource from the shared TXOP.

10. A method of controlling wireless communication in a wireless communication system, performed by an access point, the method comprising:
    cooperating with a further access point of the wireless communication system by sharing a transmit opportunity (TXOP) based on coordinated spatial reuse of at least one resource of the shared TXOP;
    receiving, from the further access point, an indication of a first level of allowed interference on the at least one resource of the shared TXOP;
    sending, to a wireless station, based on the first level of allowed interference, an indication of a second level of allowed interference on the at least one resource of the shared TXOP, to be applied by the wireless station in controlling a wireless random access transmission on the at least one resource of the shared TXOP; and
    receiving, from the wireless station, at least one wireless random access transmission performed on the at least one resource of the shared TXOP, a transmit power of the at least one wireless random access transmission depending on the indicated second level of allowed interference.

11. The method of claim 10, further comprising sending, to the wireless station, an indication of an identity of the further access point.

12. The method of claim 11, sending the indication of the second level of allowed interference, an indication of a lower bound of the path loss, an indication of the at least one resource of the shared TXOP, and/or an indication of the identity of the further access point in a trigger message for triggering one or more wireless transmissions in the shared TXOP.

13. The method of claim 10, wherein the transmit power is further based on one or more measurements performed by the wireless station to determine a path loss of a wireless signal path between the wireless station and the further access point.

14. The method of claim 13, further comprising sending, to the wireless station, an indication of a lower bound of the path loss, wherein the transmit power is further based on the indicated lower bound.

15. The method of claim 14, wherein the lower bound depends on a path loss of a wireless signal path between the further access point and the access point.

16. The method of claim 15, further comprising performing one or more measurements to determine the path loss of the wireless signal path between the further access point and the access point.

17. The method of claim 16, further comprising determining the path loss of the wireless signal path between the further access point and the access point based on one or more measurement reports from the further access point.

18. The method of claim 10, further comprising sending, to the wireless station, an indication of resources of the shared TXOP.

19. A wireless station for controlling wireless communication in a wireless communication system, the wireless station comprising:
    processing circuitry and memory, the memory containing instructions executable by the processing circuitry, whereby the wireless station is operative to:

determine a path loss of a wireless signal path between the wireless station and a first access point, the first access point cooperating with a second access point by sharing a transmit opportunity (TXOP) based on coordinated spatial reuse of at least one resource of the shared TXOP;

receive, from the second access point, an indication of a level of allowed interference on the at least one resource of the shared TXOP; and control, based on the determined path loss and the indication of the level of allowed interference, a transmit power of at least one wireless random access transmission performed on the at least one resource of the shared TXOP from the wireless station to the second access point.

20. An access point for controlling wireless communication in a wireless communication system, the access point comprising:

processing circuitry and memory, the memory containing instructions executable by the processing circuitry whereby the access point is operative to:

cooperate with a further access point of the wireless communication system by sharing a transmit opportunity (TXOP) based on coordinated spatial reuse of at least one resource of the shared TXOP;

receive, from the further access point, an indication of a first level of allowed interference on the at least one resource of the shared TXOP;

send, to a wireless station, based on the first level of allowed interference, an indication of a second level of allowed interference on the at least one resource of the shared TXOP, to be applied by the wireless station in controlling a wireless random access transmission on the at least one resource of the shared TXOP; and receive, from the wireless station, at least one wireless random access transmission performed on the at least one resource of the shared TXOP, a transmit power of the at least one wireless random access transmission depending on the indicated second level of allowed interference.

\* \* \* \* \*